(12) United States Patent
Chang et al.

(10) Patent No.: US 10,067,390 B2
(45) Date of Patent: Sep. 4, 2018

(54) LIQUID CRYSTAL DISPLAY PANEL

(71) Applicant: HON HAI PRECISION INDUSTRY CO., LTD., New Taipei (TW)

(72) Inventors: Wei-Chih Chang, New Taipei (TW); Chung-Wen Lai, New Taipei (TW); Kuo-Sheng Lee, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 133 days.

(21) Appl. No.: 15/336,933

(22) Filed: Oct. 28, 2016

(65) Prior Publication Data

US 2017/0153512 A1   Jun. 1, 2017

Related U.S. Application Data

(60) Provisional application No. 62/260,256, filed on Nov. 26, 2015.

(51) Int. Cl.
| | |
|---|---|
| G02F 1/1333 | (2006.01) |
| G02F 1/1343 | (2006.01) |
| G02F 1/1335 | (2006.01) |
| G02F 1/1339 | (2006.01) |
| G02F 1/1362 | (2006.01) |
| G02F 1/1368 | (2006.01) |
| G06F 3/044 | (2006.01) |
| G06F 3/041 | (2006.01) |

(52) U.S. Cl.
CPC ...... *G02F 1/134309* (2013.01); *G02F 1/1368* (2013.01); *G02F 1/13338* (2013.01); *G02F 1/13394* (2013.01); *G02F 1/13439* (2013.01); *G02F 1/133345* (2013.01); *G02F 1/133512* (2013.01); *G02F 1/133514* (2013.01); *G02F 1/136286* (2013.01); *G06F 3/044* (2013.01); *G06F 3/0412* (2013.01); *G02F 2001/13398* (2013.01); *G02F 2201/50* (2013.01)

(58) Field of Classification Search
CPC .................................................. G02F 1/13338
See application file for complete search history.

(56) References Cited

U.S. PATENT DOCUMENTS

| | | | | |
|---|---|---|---|---|
| 2009/0268131 A1* | 10/2009 | Tsai | ..................... | G02F 1/13338 349/106 |
| 2010/0103121 A1* | 4/2010 | Kim | ..................... | G02F 1/13394 345/173 |
| 2010/0110022 A1* | 5/2010 | Chen | ..................... | G06F 3/0414 345/173 |

(Continued)

*Primary Examiner* — James Dudek
(74) *Attorney, Agent, or Firm* — ScienBiziP, P.C.

(57) ABSTRACT

An LCD panel includes a first substrate, a second substrate, a liquid crystal layer between the first substrate and the second substrate, and a plurality of spacers extending from the first substrate to the second substrate. Each spacer is positioned in the liquid crystal layer and has a height less than a thickness of the liquid crystal layer. No electrode for sensing touches is formed on the first substrate. The second substrate has a plurality of first touch sensor electrodes and a plurality of second touch sensor electrodes corresponding to the plurality of spacers. The first touch sensor electrodes and the second touch sensor electrodes cooperatively form a capacitive touch sensing structure. The spacers move towards the second substrate when the LCD panel is being touched.

17 Claims, 8 Drawing Sheets

(56) References Cited

U.S. PATENT DOCUMENTS

| | | | |
|---|---|---|---|
| 2011/0102698 A1* | 5/2011 | Wang | G02F 1/13338 349/54 |
| 2012/0105347 A1* | 5/2012 | Pak | G06F 3/0412 345/173 |
| 2012/0147287 A1* | 6/2012 | Fujioka | G02F 1/13338 349/43 |
| 2012/0229722 A1* | 9/2012 | Fryer | G02F 1/13338 349/41 |
| 2013/0127766 A1* | 5/2013 | Zhao | G06F 3/0412 345/173 |
| 2015/0185566 A1* | 7/2015 | Choi | G02F 1/134336 349/42 |
| 2016/0370632 A1* | 12/2016 | Huang | G02F 1/13394 |

\* cited by examiner

LIQUID CRYSTAL DISPLAY PANEL

CROSS-REFERENCE TO RELATED APPLICATIONS

This application claims priority from U.S. provisional application Ser. No. 62/260,256 filed on Nov. 26, 2015 which is incorporated herein by reference.

FIELD

The subject matter herein generally relates to a liquid crystal display panel having a function of sensing touch.

BACKGROUND

A common liquid crystal display (LCD) panel has a thin film transistor (TFT) substrate, a color filter substrate facing the TFT substrate, and a liquid crystal layer positioned between the TFT substrate and the color filter substrate. The TFT substrate has a common electrode and a pixel electrode. A transverse electric field is used in the LCD panel to drive liquid crystals to rotate. The transverse electric field is formed by the common electrode and the pixel electrode. When the LCD panel is integrated with a touch sensing function, a touch sensor electrode configured for sensing touches is often formed on the color filter substrate. However, the touch sensor electrode may affect the transverse electric field. Therefore, there is room for improvement in the art.

BRIEF DESCRIPTION OF THE DRAWINGS

Implementations of the present technology will now be described, by way of example only, with reference to the attached figures.

DETAILED DESCRIPTION

Figure 1:
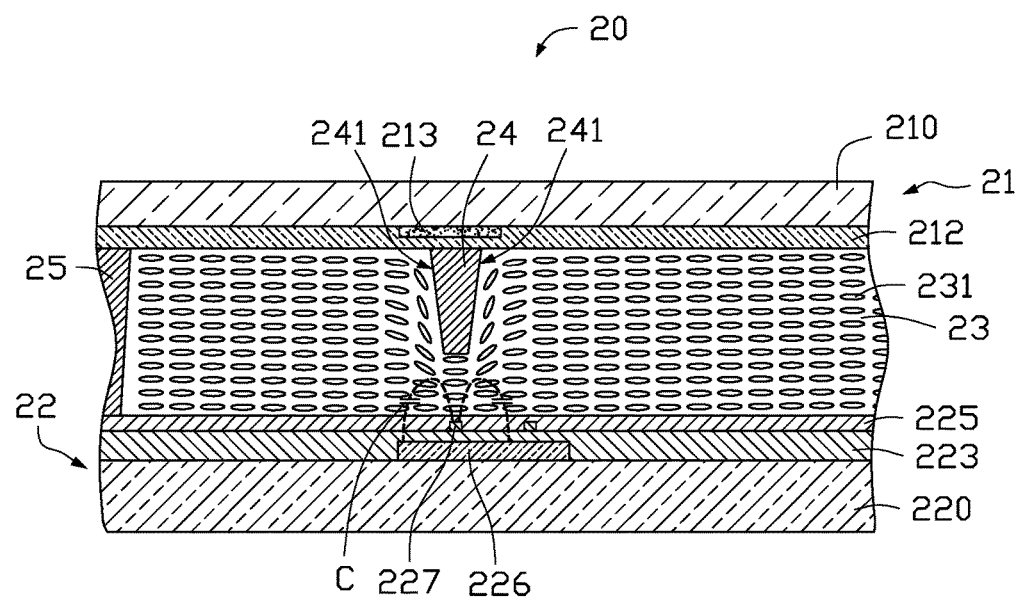
FIG. 1 is a cross-sectional view of a first exemplary embodiment of an LCD panel.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" when utilized, means "including, but not necessarily limited to"; it specifically indicates open-ended inclusion or membership in the so-described combination, group, series, and the like.

FIG. 1 illustrates a first embodiment of an LCD panel 20 in part and in cross section. The LCD panel 20 is integrated with a function of touch-sensing. The LCD panel 20 may be an in-cell touch display panel having electrodes, e.g. first touch sensor electrodes 226 and second touch sensor electrodes 227, for sensing touches are formed on a TFT substrate (e.g. a second substrate 22).

As shown in FIG. 1, the LCD panel 20 includes a first substrate 21, a second substrate 22 facing the first substrate 21, a liquid crystal layer 23 positioned between the first substrate 21 and the second substrate 22, and a plurality of spacers 24 in the liquid crystal layer 23. FIG. 1 shows only one spacer 24. Each spacer 24 is formed on the first substrate 21 and extends from the first substrate 21 to the second substrate 22. The LCD panel 20 also includes at least one photo spacer 25. The at least one photo spacer 25 is configured to maintain a distance between the first substrate 21 and the second substrate 22 for the liquid crystal layer 23. Each photo spacer 25 has a height that is equal to the thickness of the liquid crystal layer 23. The spacer 24 has a height that is less than the height of the photo spacer 25. In this exemplary embodiment, the spacer 24 has a height that is about 10% to about 70% of the thickness of the liquid crystal layer 23. For example, the photo spacer 25 has a height of about 3.2 μm, and the spacer 24 has a height of about 2.8 μm. The spacer 24 and the photo spacer 25 may be made of a same material, such as photoresist material.

In this exemplary embodiment, the first substrate 21 is a color filter substrate and includes a first base layer 210 and a color filter layer 212 formed on a surface of the first base layer 210 adjacent to the liquid crystal layer 23. A plurality of black matrices 213 are defined in the color filter layer 212. FIG. 1 shows only one black matrix 213. Each spacer 24 is formed on the color filter layer 212 and corresponds to one of the black matrices 213. Thus, the spacers 24 cannot affect an aperture ratio of the LCD panel 20.

Each spacer 24 has a width that gradually decreases along a direction from the first substrate 21 to the second substrate 22. In this exemplary embodiment, the spacer 24 has a cross-sectional trapezoidal shape. The spacer 24 has two side surfaces 241, one of the two side surfaces 241 is on one side of the spacer 24 and the other side surface 241 is on an opposite side of the spacer 24, and the two side surfaces 241 are coupled to the first substrate 21. Each side surface 241 and the first substrate 21 define an angle, the angle is in a range of about 30 degrees to about 80 degrees.

Figure 2:
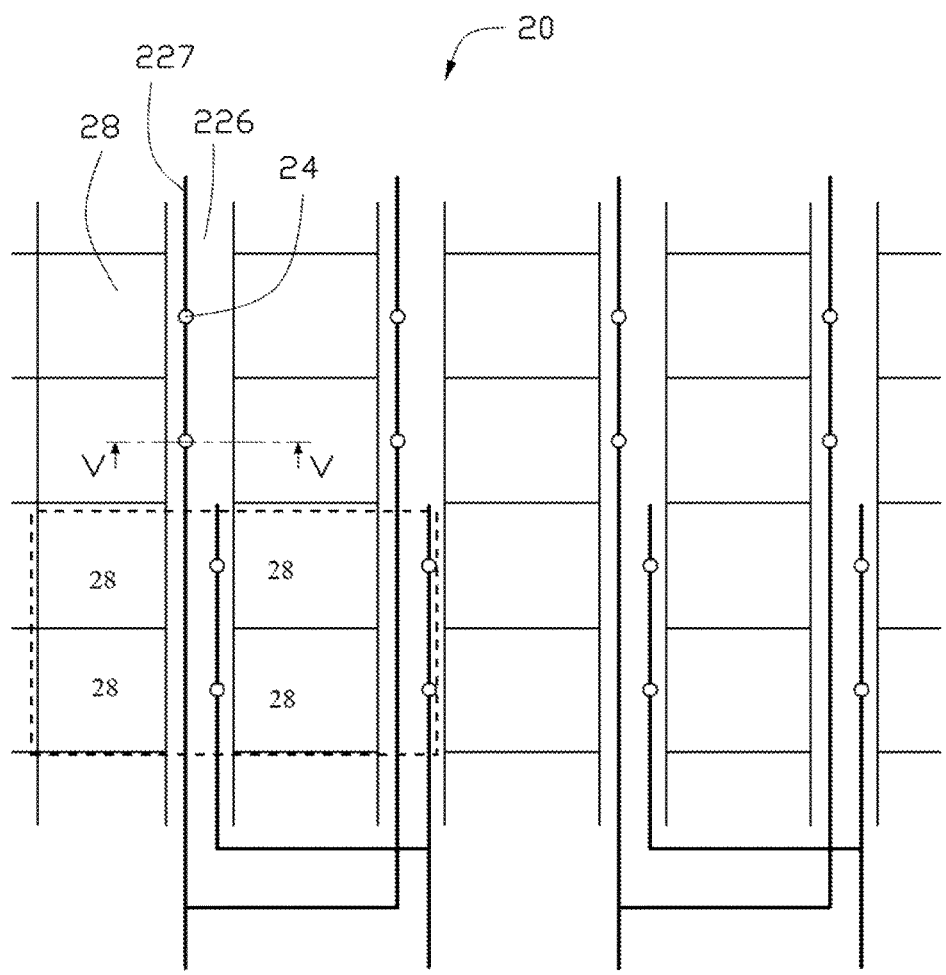
FIG. 2 is a planar view of the LCD panel in FIG. 1.

In this exemplary embodiment, the second substrate 22 is a TFT substrate and includes a second base layer 220 and a plurality of TFTs (not shown) arranged in an array formed on the second base layer 120. In this exemplary embodiment, the second substrate 220 is made of a transparent material. For example, the second substrate 220 is made of glass. In FIG. 2, the plurality of TFTs defines a plurality of pixel units 28. Each pixel unit 28 at least includes a switch TFT (not shown), a pixel electrode (not shown), and a common electrode (e. g. first touch sensor electrode 226). In this exemplary embodiment, the common electrode is shared with the first touch sensor electrode 226. Each switch TFT includes a gate electrode (not shown) electrically coupled to a scanning line (not shown), a source electrode (not shown) electrically coupled to a data line (not shown), and a drain electrode (not shown) electrically coupled to the pixel electrode. In FIG. 1, a transverse electric field is formed between the common electrode (e.g. the first touch sensor electrode 226) and the pixel electrode to drive rotation of liquid crystal molecules 231 of the liquid crystal layer 23 and to achieve a display function of the LCD panel 20.

The second substrate 22 further includes a plurality of first touch sensor electrodes 226, an insulative layer 223, a plurality of second touch sensor electrodes 227, and a protecting layer 225.

As shown in FIG. 1, the first touch sensor electrodes 226 are formed on a surface of the second base layer 220 adjacent to the liquid crystal layer 23. The insulative layer 223 is formed on the surface of the second base layer 220 having the first touch sensor electrodes 226, and the insulative layer 223 covers the first touch sensor electrodes 226. The plurality of second touch sensor electrodes 227 is formed on a surface of the insulative layer 223 adjacent to the liquid crystal layer 23. The protecting layer 225 is formed on the surface of the insulative layer 223, on which the second touch sensor electrodes 227 are formed, and the protecting layer 225 covers the second touch sensor electrodes 227. Each first touch sensor electrode 226 and each second touch sensor electrode 227 may be made of an electrically conductive material, for example, indium tin oxide (ITO). The insulative layer 223 and the protecting layer 225 may be made of a common electrically insulating material, for example, silicon nitride, silicon oxide, silicon oxynitride, aluminum oxide, yttrium oxide, hafnium oxide, zirconium oxide, aluminum nitride, aluminum oxynitride, titanium oxide, barium titanate, lead titanate, or a combination thereof.

In this exemplary embodiment, each first touch sensor electrode 226 and each second touch sensor electrode 227 have a long strip shape, and each first touch sensor electrode 226 has a width that is larger than a width of each second touch sensor electrode 227.

As shown in FIG. 1 and FIG. 2, each first touch sensor electrode 226 corresponds to at least one spacer 24 and each second touch sensor electrode 227 corresponds to at least one spacer 24. FIG. 1 is a cross-sectional view of the LCD panel of FIG. 2 along line V-V. Each second touch sensor electrode 227 corresponds to and is positioned above one first touch sensor electrode 226. Each spacer 24 is positioned above one second touch sensor electrode 227. The first touch sensor electrodes 226 are also used as the common electrode of the LCD panel 20. Each second touch sensor electrode 227 can be a conductive line.

Figure 3:
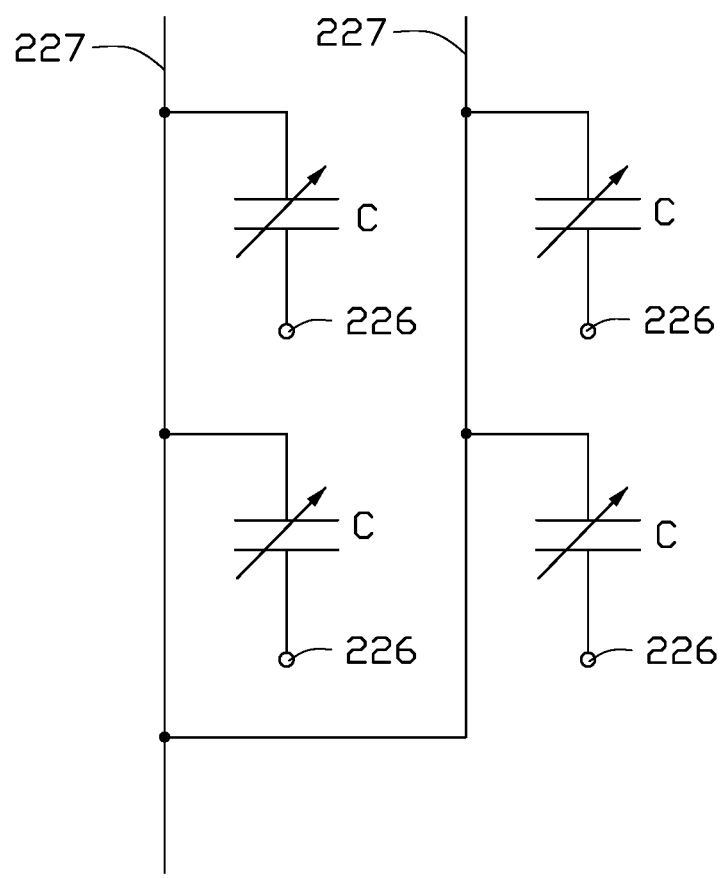
FIG. 3 is a circuit diagram of a second substrate of the LCD panel in FIG. 1.

As shown in FIG. 3, the second touch sensor electrodes 227 and the first touch sensor electrodes 226 cooperatively form a capacitive touch sensing structure. A first touch sensor electrode 226 and one corresponding second touch sensor electrode 227 cooperatively form a capacitor C.

Figure 8A:
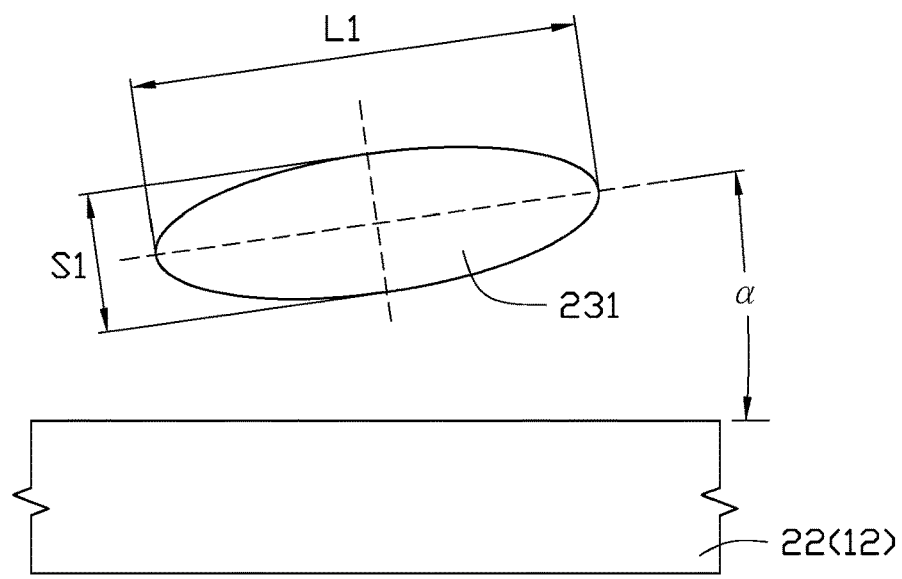
FIG. 8A to FIG. 8B are schematic views of a liquid crystal molecule of the LCD panel when the LCD panel being touched or not.
Figure 8B:
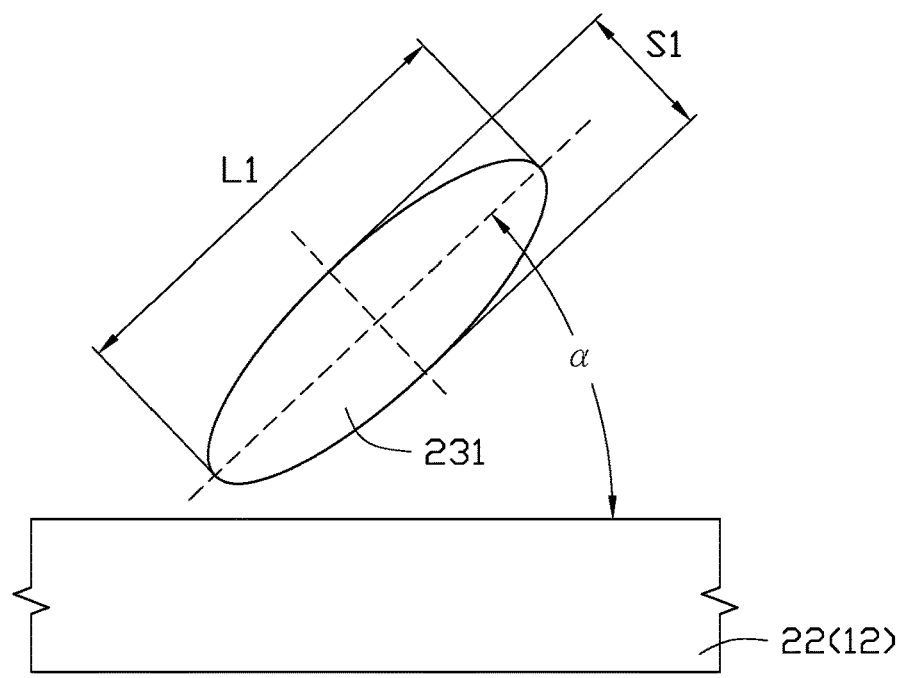

As shown in FIG. 8A and FIG. 8B, the liquid crystal molecule 231 has a long axis L1 and a short axis S1. A dielectric constant of the liquid crystal molecule 231 varies when an angle a defined by the long axis L1 of the liquid crystal molecule 231 and a plane of the second substrate 22 changes, which causes variation of the capacitance of the capacitor C. The touch position can be detected according to the variation of the capacitance of the capacitor C.

As shown in FIG. 1 and FIG. 8A, when there is no object touching the LCD panel 20, an angle a, defined by a plane of the second substrate 22 and the long axis L1 of the liquid crystal molecule 231, beneath the spacer 24 is about 0 to about 10 degrees. The angle a can equal to 0 degree.

Figure 4:
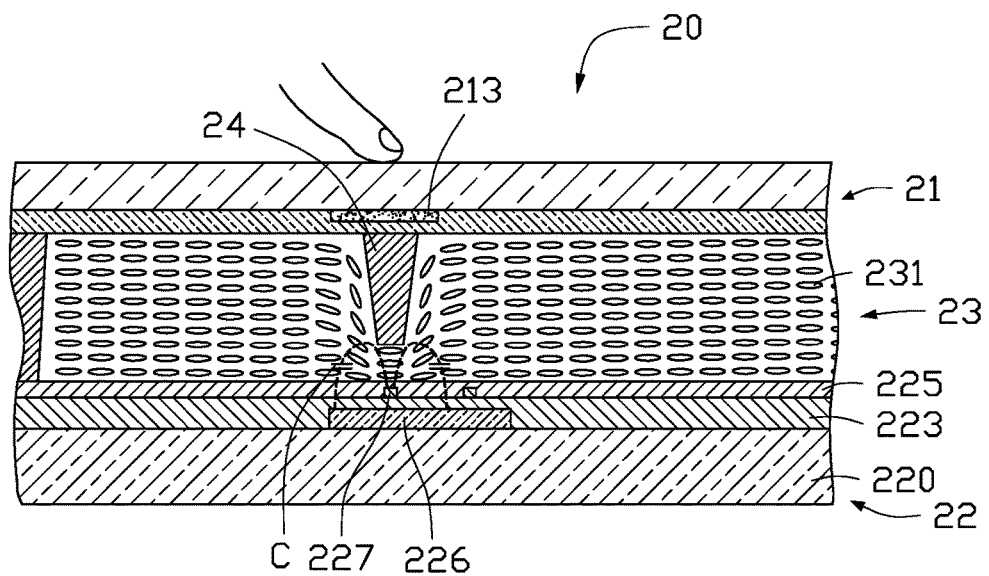
FIG. 4 is a cross-sectional view of the LCD panel in FIG. 1 being touched.

As shown in FIG. 4, when an object (such as a finger) touches the first substrate 21 of the LCD panel 20, the spacer 24 moves towards the second substrate 22, which leads the liquid crystal molecules 231 beneath the spacer 24 to rotate. As shown in FIG. 8B, the angle a, defined by the second substrate 22 and the long axis L1 of the liquid crystal molecules 231 and beneath the spacer 24, will vary to be in a range of about 20 degrees to about 80 degrees. At this time, dielectric constants of the liquid crystal molecules 231 beneath the spacer 24 vary, thus causing variance of capacitance of the capacitor C. The second touch sensor electrodes 227 output the variation of the capacitance of the capacitor C, thus detecting touch position.

Additionally, the LCD panel 20 may also be integrated with a function to sense the force of touches. When an object (such as a finger) touches the LCD panel 20, the spacer 24 at the touch position moves towards the second substrate 22, which causes variation in the capacitance of the capacitor C. Then, a moving distance of the spacer 24 can be calculated according to the variation of the capacitance of the capacitor C, and a touch force can be calculated according to the moving distance of the spacer 24.

In FIG. 2, the plurality of spacers 24 may be arranged in rows. Specifically, the spacers 24 arranged in one row correspond to one first touch sensor electrode 226 and a plurality of second touch sensor electrodes 227. In this exemplary embodiment, as shown in FIG. 2, four adjacent pixel units 28 in a dotted box defines a region unit, the four pixel units 28 are arranged in two rows, each row of the pixel unit 28 includes two pixel units 28. Each pixel units 28 defines a spacer 24, so there are two rows of the spacers 24 located in the region unit, and each row of the spacer 24 includes two spacers 24. The second touch sensor electrodes 227 corresponding to the two rows of the spacers 24 are electrically coupled to sense touches at the region unit. In other embodiments, the region unit may include more than four pixel units 28; each row of spacer 24 may include at least m spacers 24, wherein m is a natural number and m is equal to or greater than 2; and the second touch sensor electrodes 227 corresponding to n rows of the spacers 24 are electrically coupled, wherein n is a natural number and n is equal to or greater than 2. The second touch sensor electrodes 227 corresponding to the n rows of the spacers 24 output variations in capacitance of the capacitors C between the second touch sensor electrodes 227 and the corresponding first touch sensor electrodes 226. In other embodiments, each spacer 24 may correspond to one of the second touch sensor electrodes 227, and the second touch sensor electrode 227 outputs variation in capacitance of the capacitor C that is defined between the second touch sensor electrode 227 and the corresponding one of the first touch sensor electrodes 226.

No electrode for sensing touches is formed on the color filter substrate (e.g. the first substrate 21) of the LCD panel 20.

Figure 5:
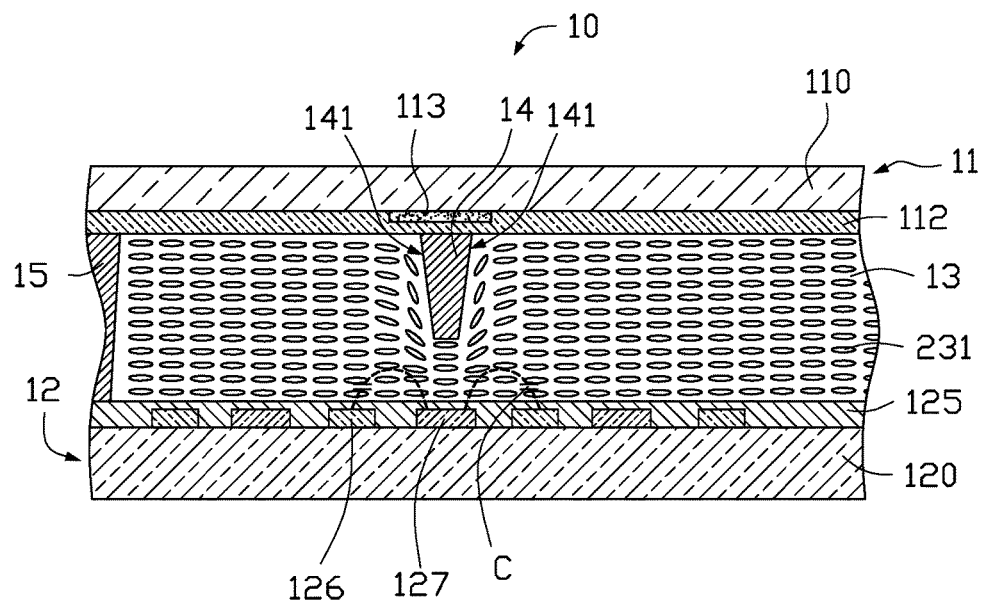
FIG. 5 is a cross-sectional view of a second exemplary embodiment of an LCD panel.

FIG. 5 illustrates a second embodiment of an LCD panel 10 in part and in cross section. The LCD panel 10 is integrated with a function of sensing touches. The LCD panel 10 is an in-cell touch display panel, and electrodes (e.g. first touch sensor electrode 126 and second touch sensor electrode 127) for sensing touches are formed on the TFT substrate (e.g. second substrate 12).

The LCD panel 10 includes a first substrate 11, a second substrate 12 facing the first substrate 11, a liquid crystal layer 13 positioned between the first substrate 11 and the second substrate 12, and a plurality of spacers 14 in the liquid crystal layer 13. FIG. 5 shows only one spacer 24. Each spacer 14 is formed on the first substrate 11 and extends from the first substrate 11 to the second substrate 12. The LCD panel 10 also includes at least one photo spacer 15 that is configured to maintain a distance between the first substrate 11 and the second substrate 12. Each photo spacer 15 has a height that is equal to the thickness of the liquid crystal layer 13. The spacer 14 has a height that is less than the height of the photo spacer 15. In this exemplary embodiment, the spacer 14 has a height that is 10% to 70% of the thickness of the liquid crystal layer 13. For example, the photo spacer 15 has a height of 3.2 μm, and the spacer 14 has a height of 2.8 μm. The spacer 14 and the photo spacer 15 may be made of a same material, such as photoresist material.

In this exemplary embodiment, the first substrate 11 is a color filter substrate and includes a first base layer 110 and a color filter layer 112 formed on a surface of the first base layer 110 adjacent to the liquid crystal layer 13. A plurality of black matrices 113 are defined in the color filter layer 112. FIG. 1 shows only one black matrix 113. Each spacer 14 is formed on the color filter layer 112 and corresponds to one of the black matrices 113. Thus, the spacers 14 cannot affect an aperture ratio of the LCD panel 10.

Each spacer 14 has a width that gradually decreases along a direction from the first substrate 21 to the second substrate 12. In this exemplary embodiment, the spacer 14 has a trapezoidal cross-sectional shape. The spacer 14 has two side surfaces 141, one of the two side surfaces 141 is on one side of the spacer 14 and the other side surface 141 is on an opposite side of the spacer 14. Both the two side surfaces 141 are coupled to the first substrate 11. Each side surfaces 141 and a plane of the first substrate 11 define an angle that is in a range of about 30 degrees to about 80 degrees.

In this exemplary embodiment, the second substrate 12 is a TFT substrate and includes a second base layer 120, a plurality of first TFTs (not shown), and a plurality of second TFTs 175 (shown in FIG. 6) formed on the second base layer 120. The plurality of first TFTs is configured for displaying and defines a plurality of pixel units (not shown). Each pixel unit at least includes a first TFT (not shown), a pixel electrode (not shown), and a common electrode (e.g. second touch sensor electrode 127). The first TFT includes a gate electrode (not shown) electrically coupled to a scanning line (not shown), a source electrode (not shown) electrically coupled to a data line (not shown), and a drain electrode (not shown) electrically coupled to the pixel electrode. A transverse electric field is formed between the common electrode and the pixel electrode to rotate the liquid crystal molecules 231 of the liquid crystal layer 13; as such display function is achieved. The second TFTs 175 are configured for sensing touches.

The second substrate 12 further includes a plurality of first touch sensor electrodes 126, a plurality of second touch sensor electrodes 127, and a protecting layer 125. In this exemplary embodiment, the second substrate 120 is made of a transparent material. For example, the second substrate 120 is made of glass.

As shown in FIG. 5, the first touch sensor electrodes 126 and the second touch sensor electrodes 127 are formed on a surface of the second base layer 120 adjacent to the liquid crystal layer 13. The protecting layer 225 is formed on the second base layer 120 and covers both the first touch sensor electrodes 126 and the second touch sensor electrodes 127. Each first touch sensor electrode 126 and each second touch sensor electrode 127 may be made of an electrically conductive material, for example, indium tin oxide (ITO). The protecting layer 125 may be made of a common electrically insulating material, for example, silicon nitride, silicon oxide, silicon oxynitride, aluminum oxide, yttrium oxide, hafnium oxide, zirconium oxide, aluminum nitride, aluminum oxynitride, titanium oxide, barium titanate, lead titanate, or a combination thereof.

Figure 6:
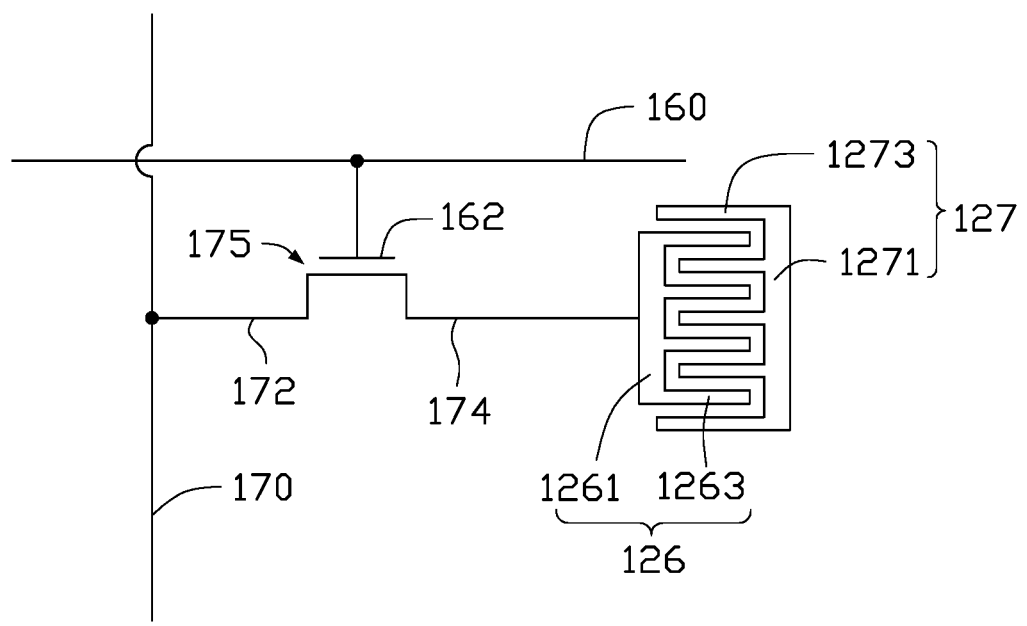
FIG. 6 is a circuit diagram of a second substrate of the LCD panel in FIG. 5.

As shown in FIG. 6, each second TFT 175 includes a gate electrode 162, a channel layer (not shown), a drain electrode 172, and a source electrode 174. The gate electrode 162 is electrically coupled to a touch scanning line 160, and the touch scanning line 160 extends along a first direction as shown in FIG. 6. The drain electrode 172 is electrically coupled to a touch data line 170, and the touch data line 170 extends along a second direction as shown in FIG. 6. The second direction is different from the first direction. In this exemplary embodiment, the first direction is perpendicular to the second direction. The source electrode 174 is electrically coupled to the first touch sensor electrode 126. The touch scanning line 160 is configured to power on or power off the second TFT 175. The touch data line 170 is configured to output a variation in capacitance of a capacitor C, and the capacitor C is defined by the first touch sensor electrodes 126 and the second touch sensor electrodes 127.

In this exemplary embodiment, the gate electrode 162 and the touch scanning line 160 may be defined by a single electrically conductive material layer (not shown) and formed in a single process. The drain electrode 172, the source electrode 174, and the touch data line 170 may be defined by a single electrically conductive material layer (not shown) and formed in a single process.

In this exemplary embodiment, the first touch sensor electrodes 126 and the second touch sensor electrodes 127 may be defined by a single electrically conductive material layer (not shown) and formed in a single process. In this exemplary embodiment, the first touch sensor electrode 126 and the second touch sensor electrode 127 each have the shape of a comb; the combs have teeth that interleaved with one another. That is, each first touch sensor 126 has a first main portion 1261 and a plurality of first extending portions 1263 extending from the first main portion 1261. The plurality of first extending portions 1263 are facing each other and parallel to each other. Each second touch sensor electrode 127 has a second main portion 1271 and a plurality of second extending portions 1273 extending from the second main portion 1271. The plurality of second extending portions 1273 are facing each other and parallel to each other. Each first extending portion 1263 is positioned between and is spaced apart from the two adjacent second extending portions 1273.

Each first touch sensor electrode 126 and one second touch sensor electrode 127 cooperatively form a capacitive touch sensing structure. The second touch sensor electrode 127 and the first touch sensor electrode 126 cooperatively form a capacitor C. As shown in FIG. 8A and FIG. 8B, the liquid crystal molecule 231 of the liquid crystal layer 13 has a long axis L1 and a short axis S1. A dielectric constant of the liquid crystal molecule 131 changes when an angle a defined by the long axis L1 of the liquid crystal molecule 131 and a plane of the second substrate 12 changes, which causes variation in the capacitance of the capacitor C. A touch position can be detected according to the variation of the capacitance between the first touch sensor electrode 126 and the second touch sensor electrode 127.

Figure 7:
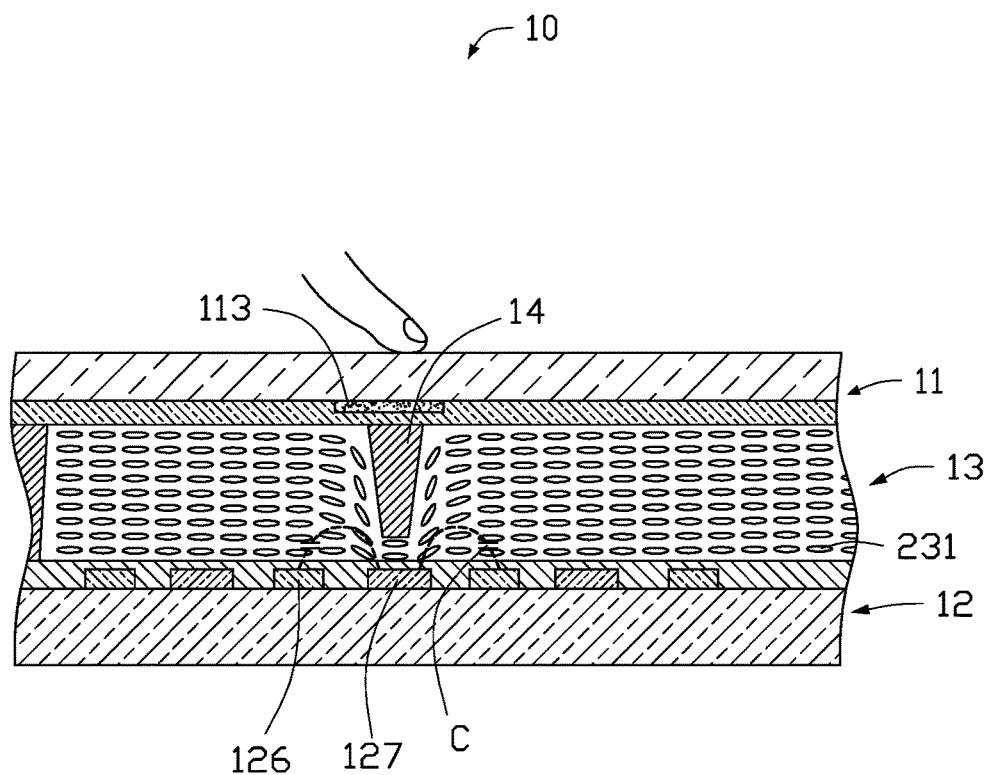
FIG. 7 is a cross-sectional view of the LCD panel in FIG. 5 being touched.

As shown in FIG. 5 and FIG. 8A, when there is no object touching on the LCD panel 10, the angle a defined by the second substrate 12 and the long axis L1 of the liquid crystal molecule 131 beneath the spacer 14 is in a range of 0 to 10 degrees. As shown in FIG. 7, when an object (such as a finger) touches the LCD panel 10, the spacer 14 moves towards the second substrate 12, which leads the liquid crystal molecules 131 beneath the spacer 14 to rotate. As shown in FIG. 8B, the angle a defined by the second substrate 12 and the long axis L1 of the liquid crystal molecules 131 beneath the spacer 14 will thus vary to be in a range of 20 degrees to 80 degrees. At this time, dielectric constants of the liquid crystal molecules 131 beneath the spacer 14 vary, which causes variation in capacitance of the capacitor C, and the touch data line 170 outputs the variation of the capacitance of the capacitor C. Touch position can be detected according to the variation of the capacitance of the capacitor C.

In this exemplary embodiment, the touch scanning line 160 can be also used as common line of the LCD panel 10. The second touch sensor electrode 127 can be also used as common electrode of the LCD panel 10.

Additionally, the LCD panel 10 may also be integrated with a function of sensing force of a touch. When an object (such as a finger) touches the LCD panel 10, the spacer 14 at the touch position moves towards the second substrate 12, which leads capacitance of the capacitor C to vary. A moving distance of the spacer 14 can be calculated according to the variation of the capacitance of the capacitor C, and a touch force can be calculated.

The embodiments shown and described above are only examples. Many details are often found in the art such as other features of a display device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A LCD panel comprising:
   a first substrate being a color filter substrate;
   a second substrate facing the first substrate;
   a liquid crystal layer between the first substrate and the second substrate; and
   a plurality of spacers extending from the first substrate to the second substrate, each one of the plurality of spacers positioned in the liquid crystal layer and having a height less than a thickness of the liquid crystal layer;
   wherein no electrode for sensing touch is formed on the first substrate; the second substrate comprises a plurality of first touch sensor electrodes corresponding to the spacers and a plurality of second touch sensor electrodes corresponding to the spacers; the plurality of first touch sensor electrodes are spaced apart from and insulated from the plurality of second touch sensor electrodes; the plurality of the first touch sensor electrodes and the plurality of second touch sensor electrodes cooperatively form a capacitive touch sensing structure; the spacers are capable of moving towards the second substrate when the LCD panel is being touched, and one of the first touch sensor electrodes and one of the second touch sensor electrodes define a capacitor having a capacitance, the capacitance varies when the spacers move towards the second substrate.

2. The LCD panel of claim 1, wherein a plurality of black matrices is defined in the first substrate, each spacer corresponds to one of the black matrices.

3. The LCD panel of claim 1, wherein each spacer has a width gradually decrease along a direction from the first substrate to the second substrate.

4. The LCD panel of claim 3, wherein each spacer has a cross-sectional shape of trapezoid.

5. The LCD panel of claim 4, wherein each spacer comprises two side surfaces, one of the two side surfaces is on one side of the spacer and the other side surface is on an opposite side of the spacer; both the two side surfaces are coupled to the first substrate; an angle defined by each side surface and a plane of the first substrate is 30 degrees to 80 degrees.

6. The LCD panel of claim 1, wherein each spacer has a height of 10% to 70% of the thickness of the liquid crystal layer.

7. The LCD panel of claim 1, wherein the second substrate further comprises a second base layer and an insulative layer, the plurality of first touch sensor electrodes are formed on a surface of the second base layer adjacent to the liquid crystal layer; the insulative layer is formed on the second base layer and covers the plurality of first touch sensor electrodes; the second touch sensor electrodes are formed on a surface of the insulative layer adjacent to the liquid crystal layer.

8. The LCD panel of claim 7, wherein the second substrate further comprises a protecting layer, the protecting layer is formed on the insulative layer and covers the second touch sensor electrodes.

9. The LCD panel of claim 7, wherein each first touch sensor electrode and each second touch sensor electrode have a long strip shape; and each first touch sensor electrode has a width, the width is greater than a width of each second touch sensor electrode.

10. The LCD panel of claim 9, wherein each second touch sensor electrode is a conductive line.

11. The LCD panel of claim 7, wherein the plurality of spacers is arranged in rows; the spacers arranged in each row correspond to one of the first touch sensor electrodes and a plurality of second touch sensor electrodes; and the plurality of second touch sensor electrodes corresponding to at least one row of spacers is electrically coupled.

12. The LCD panel of claim 11, wherein the plurality of second touch sensor electrodes is electrically coupled and is configured to output capacitance variations of the capacitor defined by the first touch sensor electrodes and the second touch sensor electrodes.

13. The LCD panel of claim 1, wherein the second substrate further comprises a second base layer, the first touch sensor electrodes and the second touch sensor electrodes are formed on a surface of the second base layer adjacent to the liquid crystal layer.

14. The LCD panel of claim 13, wherein the second substrate further comprises a protecting layer, the protecting layer is formed on the second base layer and covers the plurality of the first touch sensor electrodes and the plurality of second touch sensor electrodes.

15. The LCD panel of claim 13, wherein the second substrate further comprises a plurality of second TFTs; each second TFT comprises a gate electrode electrically coupled to a touch scanning line, a drain electrode electrically coupled to a touch data line, and a source electrode electrically coupled to one of the first touch sensor electrodes; the touch scanning line is configured to switch between a power-on mode and a power-off mode of the second TFT; the touch data line is configured to output capacitance variations of the capacitor defined by the first touch sensor electrodes and the second touch sensor electrodes.

16. The LCD panel of claim 13, wherein each first touch sensor electrode and each second touch sensor electrode are shaped like a comb.

17. The LCD panel of claim 16, wherein each first touch sensor has a first main portion and a plurality of first extending portions extending from the first main portion; the plurality of first extending portions faces each other and is parallel to each other; each second touch sensor electrode has a second main portion and a plurality of second extending portions extending from the second main portion; the plurality of second extending portions faces each other and parallel to each other; and each first extending portion is positioned between and spaced apart from the two adjacent second extending portions.

* * * * *